United States Patent [19]

Lee

[11] Patent Number: 4,674,000

[45] Date of Patent: Jun. 16, 1987

[54] CLEANING DEVICE FOR THE MAGNETIC HEADS OF VIDEO TAPE RECORDERS

[76] Inventor: Jeen-Ju Lee, No. 4, Lane 605, Sec. 1, Ney Hwu Road, Taipei City, Taiwan

[21] Appl. No.: 628,041

[22] Filed: Jul. 5, 1984

[51] Int. Cl.$^4$ .......................... G11B 23/08; G11B 5/41
[52] U.S. Cl. .................................... 360/128; 360/132; 206/387; 242/198
[58] Field of Search ............ 360/128, 132; 15/210 R, 15/DIG. 12; 206/387; 242/198

[56] References Cited

U.S. PATENT DOCUMENTS

| | | | |
|---|---|---|---|
| 4,388,663 | 6/1983 | Becella | 360/128 |
| 4,470,089 | 9/1984 | Hutchins et al. | 360/128 |
| 4,490,761 | 12/1984 | Wolynski et al. | 360/128 |
| 4,498,113 | 2/1985 | Clausen et al. | 360/128 |
| 4,616,284 | 10/1986 | Fritsch | 360/128 |

FOREIGN PATENT DOCUMENTS 2127204  4/1984  United Kingdom ................ 360/128

*Primary Examiner*—Robert S. Tupper
*Attorney, Agent, or Firm*—Cushman, Darby & Cushman

[57] ABSTRACT

The present invention relates to a device for cleaning the magnetic head in video tape recorders. The device includes a cartridge housing similar to the housing of the video tape cassette, a pair of tape reels rotatably mounted therein, a cleaning tape having its ends respectively secured to the reels for winding thereon, and a detergent storage unit rotatably mounted thereby which is capable of coating the cleaning tape with a wet, dry, wet, dry action. A driving device drives one of the tape reels and the detergent storage unit causing them to rotate at a constant angular velocity for promoting the cleaning effect on the magnetic head. The present invention also provides an improved housing and reels which can be assembled or dissembled by a simple procedure, so that the cleaning tape may be easily replaced.

13 Claims, 12 Drawing Figures

CLEANING DEVICE FOR THE MAGNETIC HEADS OF VIDEO TAPE RECORDERS

BACKGROUND OF THE INVENTION

The present invention relates to a cleaning device for cleaning the magnetic head(s) of video tape recorders. After the operation of a video tape recorder for some time, the dust in the air and the magnetic dust from the video tape sticks to the surface of the magnetic head, which must then be cleaned.

Many kinds of devices have been developed for cleaning the heads of video tape recorders. One type of device utilizes a cartridge housing similar to that of a video tape cassette. A pair of tape reels is rotatably mounted in the housing. A cleaning tape is wound on the two tape reels in the same way as a video recording tape is wound on the tape reels of the video tape cassette. At a proper location on the path of the cleaning tape is mounted a detergent storage unit, which can press against the outer surface of the cleaning tape. The cleaning device can be put into the compartment of the video tape recorder in the same manner that one would install a video cassette. At the touch of the RECORDING or PLAY key, the cleaning tape is driven forward, first through the detergent storage unit for receiving a coating of detergent, and then against the surface of the head to coat the surface dirt with detergent. As the detergent storage unit is stationary, the cleaning tape will be wet with detergent after passing through the detergent storage unit. All portions of the cleaning tape that have passed by the head are wet. The wet cleaning tape can only brush aside dirt from the head surface and is unable to clean it effectively.

Another known device adapted the detergent storage unit into cylindrical form, driven and rotated by the cleaning tape. As only part of the circumference of the detergent storage unit can ooze detergent, the cleaning tape develops alternate wet and dry portions. The wet portions dissolve dirt on the head, which is then absorbed by the dry portions. After sustained alternating dry and wet, the dirt can be effectively cleaned away. But its drawback is that the rotating motion of the cylindrical detergent storage unit fully depends on the friction force between its surface and the cleaning tape. Therefore, the linear speed of the cleaning tape and that of the cylindrical detergent storage unit are not the same. This is apt to lead to unstable linear speed or even failure of rotation of the detergent storage unit.

Moreover, in the known devices discussed above, the cleaning tape, when dirty, cannot be changed. The entire cartridge housing must be discarded. Also, there is no proper position in which to place the detergent bottle.

Therefore, the main purpose of this invention is to overcome the unsolved problems of the various known cleaning devices. A driving device is mounted between the detergent storage unit and the nearer tape reel for rotating the detergent storage unit through the agency of the driven tape reel in order to maintain an equivalency between the linear speed of the former and that of the latter. A constant ratio between the length of the dry portion and that of the wet portion on the cleaning tape must be maintained.

The invention also provides a loading chamber that can be conveniently opened, and detachable tape reels so that users can conveniently replace a used cleaning tape with a new one. This invention also provides a compartment in the above-mentioned loading chamber for storage of the detergent bottle.

SUMMARY OF THE INVENTION

The present invention relates to a cleaning device for cleaning the magnetic head in video tape recorders. It includes a cartridge housing of similar size to that of a standard video tape cassette. In the housing are mounted two tape reels, on which are respectively fixed the two ends of the cleaning tape, that are driven via grooves of the tape reels along the same path as that of a conventional video tape. At a proper location on the path of the cleaning tape is rotatably mounted from the outside of the cleaning tape a detergent storage unit that can store detergent and is in a position to apply proper pressure to the cleaning tape. The detergent storage unit has one or a few pieces of cleaning felt that protrude outward. On the detergent storage unit and the nearer tape reel are respectively mounted two gears that mesh with one another. Therefore, when the tape reel rotates, the angular velocity of the detergent storage unit and that of the tape reel will maintain a constant ratio of velocity, and the cleaning felt can intermittently coat the cleaning tape with detergent in a regular manner. The cartridge housing can be detached conveniently. The tape reels are composed of one upper and one lower reel member which can snap together by means of several snap tenons on one of the reel members and retaining rings on the other. Therefore, once the cleaning tape becomes dirty, the two reel members can be detached. The reel member with the cleaning tape can be discarded and replaced with a new one with clean tape for renewed use in the cartridge housing. On the rear side of the housing is a detergent storage unit that can store a detergent storage bottle and can be closed with a cover. This invention also provides a kind of housing that can store several pairs of tape reels with cleaning tape.

Thus, the object of the present invention provides a more practical cleaning device producing more even wet and dry portions of the cleaning tape, in order to improve cleaning of the magnetic head.

Another object of the present invention is to provide an improved housing which can be more easily assembled and disassembled.

It is still another object of the present invention to provide a tape reel that can be detached to exchange the old cleaning tape for a new one.

Yet another object of this invention is to provide the structure for conveniently storing the detergent bottle.

And it is a further object of this invention to provide a housing that can store several pairs of tape reels.

DETAILED DESCRIPTION OF THE PREFERRED EMBODIMENT

Figure 1:
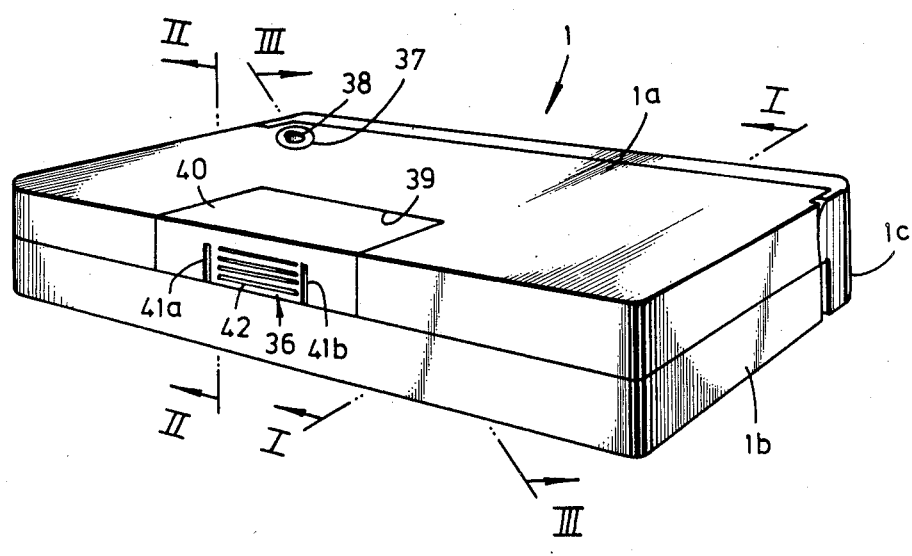
FIG. 1 is a rear perspective view of a cleaning device constructed in accordance with and embodying the present invention.

FIG. 1 is a rear perspective view of a device according to the present invention. Housing 1 comprises an upper cover 1a and a lower cover 1b, as well as a side cover 1c. Of the three covers, the lower cover 1b and side cover 1c are similar to those of the conventional video tape. On the upper left corner of the upper cover 1a is a liquid-guiding device 37 with an injection hole 38 for injecting detergent. On the rear side of the upper cover 1a is a gap 39 closed with a cover 40 which has two parallel grooves 41a and 41b. Between the two parallel grooves are several protruding threads 42. The cover 40 can be lifted by pressing the finger on the threads 42.

Figure 2:
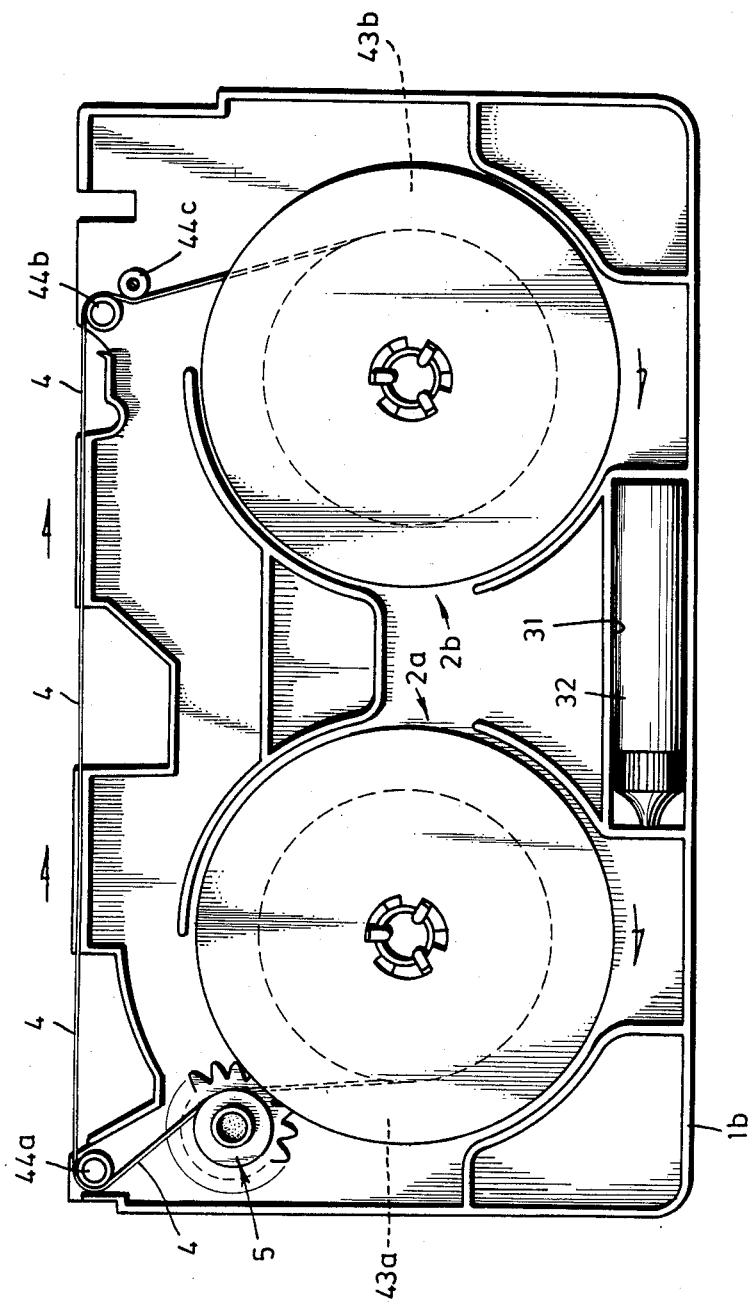
FIG. 2 is a top view of a device with its upper cover removed, showing the cleaning tape with its both its ends wound up on the two tape reels and passing the detergent storage unit.

FIG. 2 is a top view of the device with the cover closed. Within the lower cover 1b are rotatably mounted two tape reels 2a and 2b and between the grooves of which 43a, 43b respectively are fixed both ends of the cleaning tape 4. Conventional tape guide rollers 44a, 44b, 44c are also used to prescribe the path of the cleaning tape 4. Between the tape guide roller 44a and the tape reel 2a is mounted a rotatable detergent storage unit 5 at a location to apply proper pressure to the cleaning tape 4.

Figure 3:
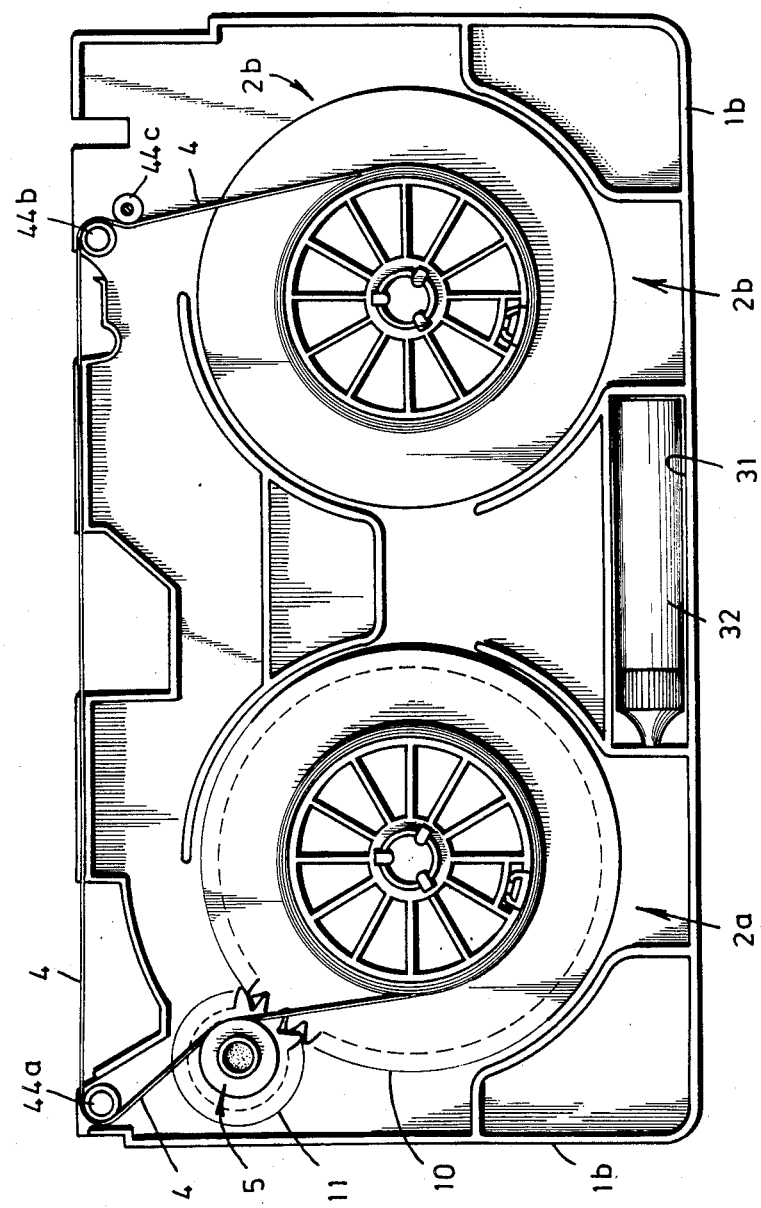
FIG. 3 is a top view of a device with the upper cover and upper reel member removed, showing the driving mechanism.

Please refer to FIG. 3. On the tape reel 2a nearer the detergent storage unit within the lower cover 1b of the housing is mounted a major gear 10 that can rotate with the tape reel 2a. A minor gear 11 is mounted on the detergent storage unit 5 for rotating the detergent storage unit 5. Major gear 10 and minor gear 11 are meshed and move in a constant speed ratio. Therefore the length of the dry stretch and that of the wet stretch formed on the cleaning tape by the constant-speed rotation of the detergent storage unit, will assume a constant ratio.

In order to enable the cleaning tape 4 and detergent storage unit 5 to make non-slippage or minimum-slippage contact, the ratio between the number of the teeth of the minor gear 11 and those of the major one 10, as well as the ratio between the diameter of the detergent storage unit 5 and the mean diameter of the tape reels 2, are selected in accordance with the following relationships:

$$N_{11}/N_{10} = D_5/D_2$$

In which:

$N_{11}$ = number of teeth of the minor gear 11

$N_{10}$ = number of teeth of the major gear 10

$D_5$ = diameter of the detergent storage unit 5

$D_2$ = mean diameter of the tape reels 2 before and after the winding of the cleaning tape.

Since the cleaning tape is not long, the thickness formed by the winding of the cleaning tape on the tape reels is not very large. The mean diameter of the tape reels varies little. So when the cleaning tape passes the detergent storage unit 5, almost pure rolling can still be maintained between the former and the latter. Even if there is a little friction between them, that would not affect the whole rolling/pressing effect.

The major gear 10 and minor gear 11 can also be replaced with pulleys, which can be driven and rotated by winding cross belts on them. As there is not much load on the cleaning tape, the belts are not apt to skid and can run more smoothly.

If the diameter of the detergent storage unit is enlarged, the exposed cleaning felt, for the sake of meeting actual demands, will not be limited to one location.

Figure 7:
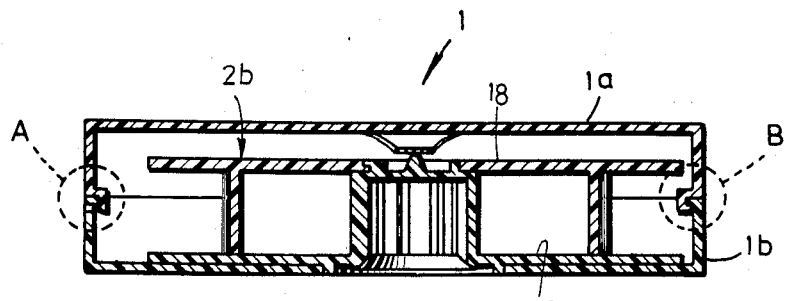
FIG. 7 is a sectional view of FIG. 1 taken along with the cut line I—I, showing the structure for snapping together the upper and lower covers of the housing.
Figure 8:
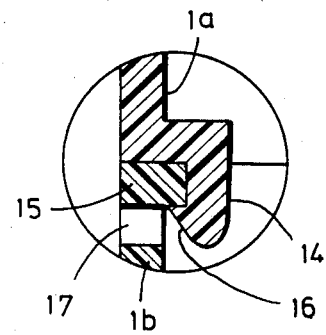
FIG. 8 is a locally enlarged view of part A of FIG. 7, showing the two tenons snapping together.
Figure 9:
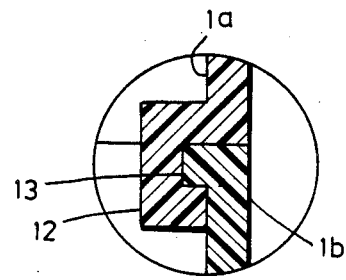
FIG. 9 is a locally enlarged view of part B of FIG. 7, showing the two tenons snapping together.

As shown in FIG. 7, for conveniently changing the cleaning tape, the housing is assembled by snapping together the upper cover 1a and lower cover 1b. The mortise 12 of the upper cover 1a and the tenon 13 of the lower cover as shown in FIG. 9 on the right part of the above-mentioned housing 1 are snapped together first. Then upper cover 1a is pressed downward to the lower cover 1b on the left part of the housing 1, and the mortise 14 on the upper cover 1a will slide by the guiding action of the slope into the tenon 15 of the lower cover 1b and snap to position as shown in FIG. 8. In lifting the upper cover 1a, it is only necessary to insert an article, such as for example, the tip of a ball point pen, screwdriver, or other such object into the hole 17 and thrust inward the mortise 14 to open the upper cover for the tape-change job.

Figure 4:
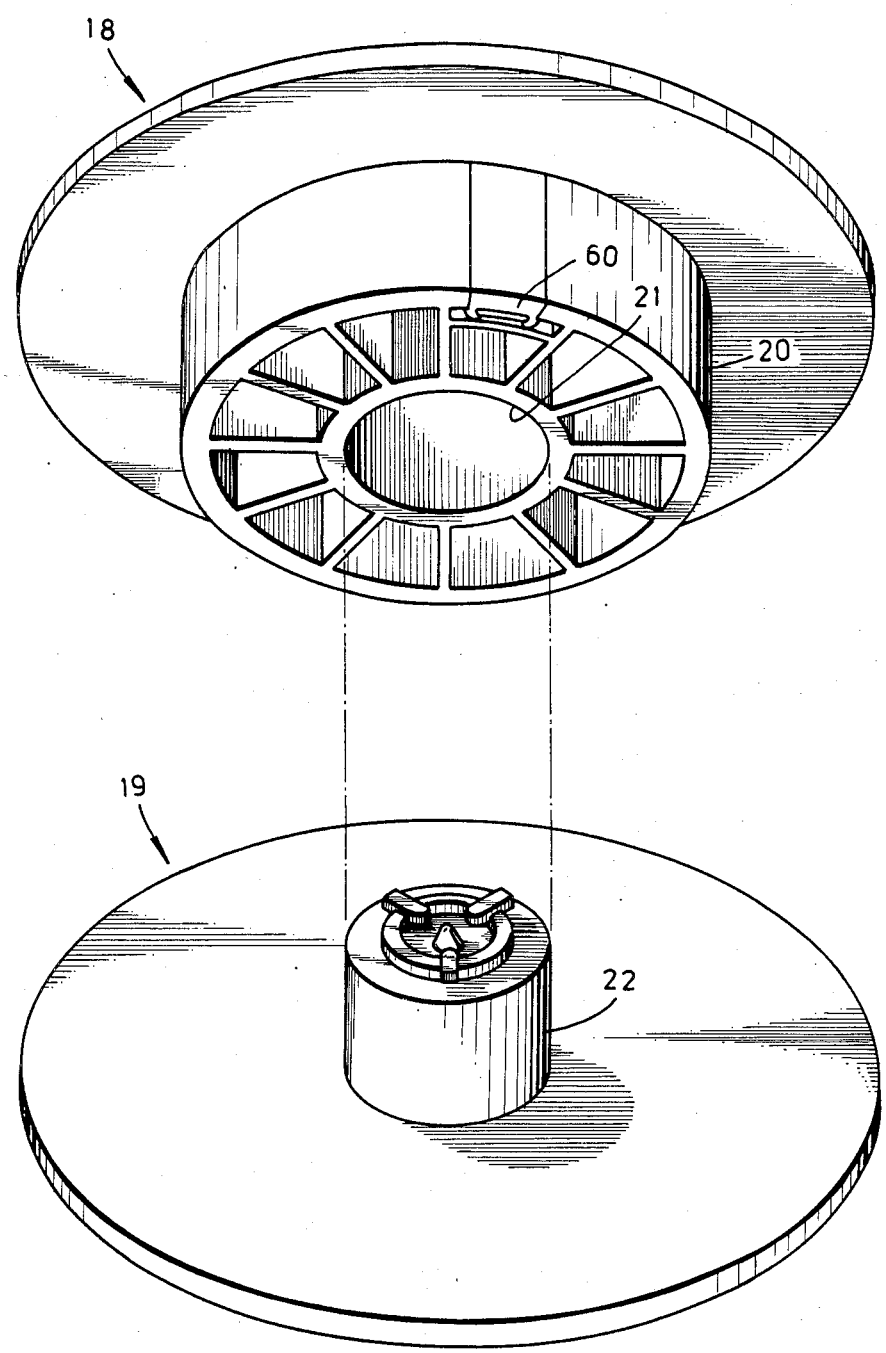
FIG. 4 is a perspective view of a tape reel, showing the top of the lower reel member and the bottom of the upper reel member.
Figure 5:
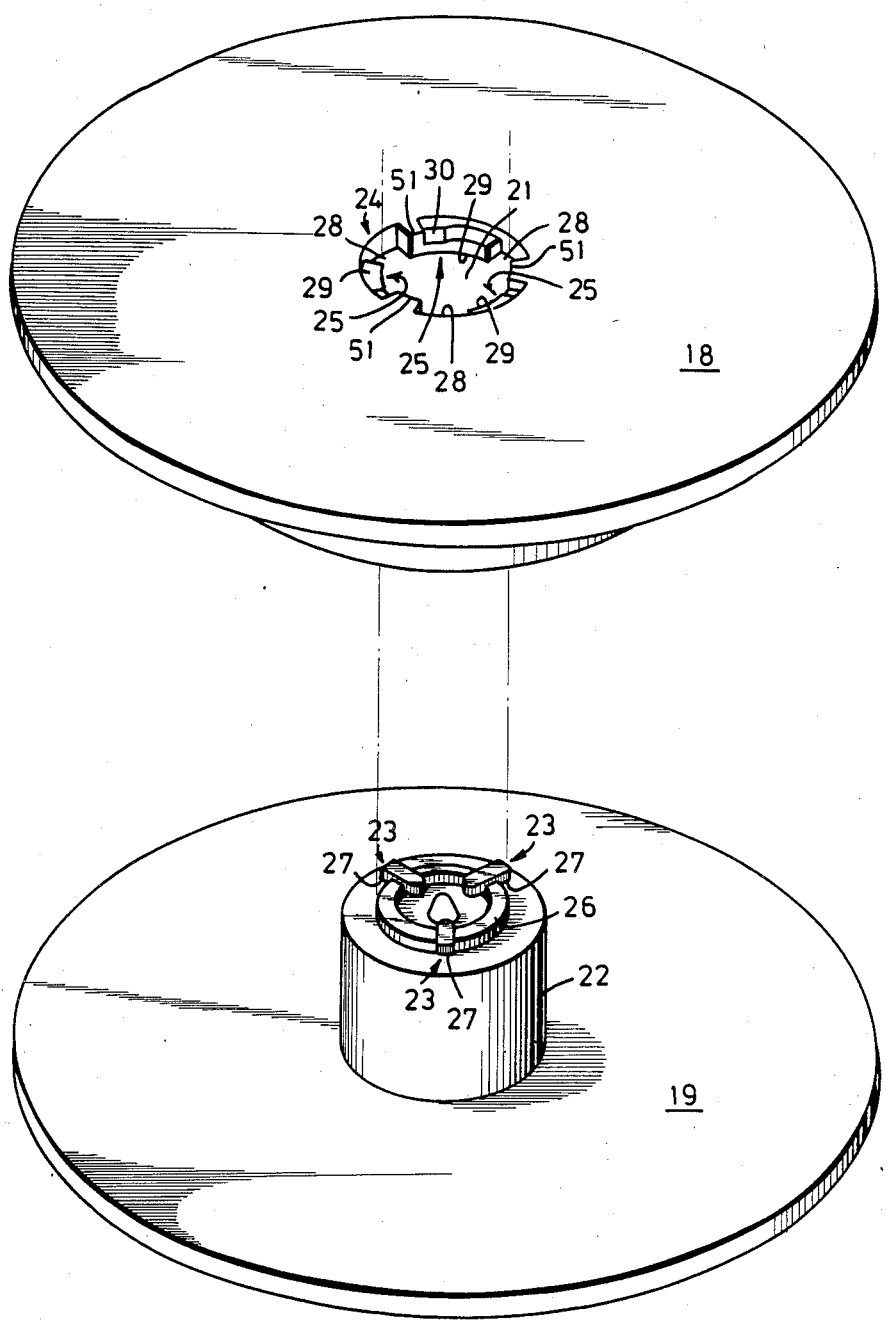
FIG. 5 is a top perspective view of a tape reel, showing the structure of the upper and lower reel members.

Please refer now to FIGS. 4 and 5. Tape reel 2b includes an upper reel member 18 and lower reel member 19. The upper reel member 18 includes a rim 20 on which to wind the cleaning tape and a center pole hole 21 for insertion of the center pole 22 of the lower reel member 19 for assembly. In addition, the rim 20 is equipped with a general fixing element 60 for fixing the end of the cleaning tape.

As shown in FIG. 5, at the center of the lower reel member 19 is a center pole whose top has three snap tenons that form a circle. When assembling the upper and lower reel members 18 and 19, the center pole 22 of the lower reel member 19 is inserted into the center pole hole 21; meanwhile the three snap tenons 23 on the center pole 22 touch the retaining ring 24 on the top of the center pole hole 21 and snap together the upper reel member 18 and lower reel member 19 through their mutual rotation (the retaining ring 24 and snap tenons 23 will be described in detail later) to combine into a complete tape reel. If the cleaning tape becomes dirty from repeated use, the upper and lower reel members are twisted open in opposite directions and the upper reel member is discarded with the dirty cleaning tape and replaced it with another upper reel member with new cleaning tape for renewed use. Therefore the whole housing can remain in use, reducing unnecessary waste on the part of users.

All of the three snap tenons 23 extend from their positioning rings outward to form juts 27. The retaining ring 24 has three extensions 25, each with their own guiding stage 29, positioning stage 30 and impediments 51, as shown in FIG. 5. When assembling, the juts 27 extend upward through the three gaps 28 of the retaining ring 24. At this time, if the lower reel member is turned counter-clockwise as indicated in the drawing, or if the upper reel member is turned clockwise, the three juts 27 will slide along the guiding stage 29 to the more depressed positioning stage 30 and snap into position after being stopped by the impediment 51, thus effecting a tight assembly of the upper and lower reel members.

Figure 6:
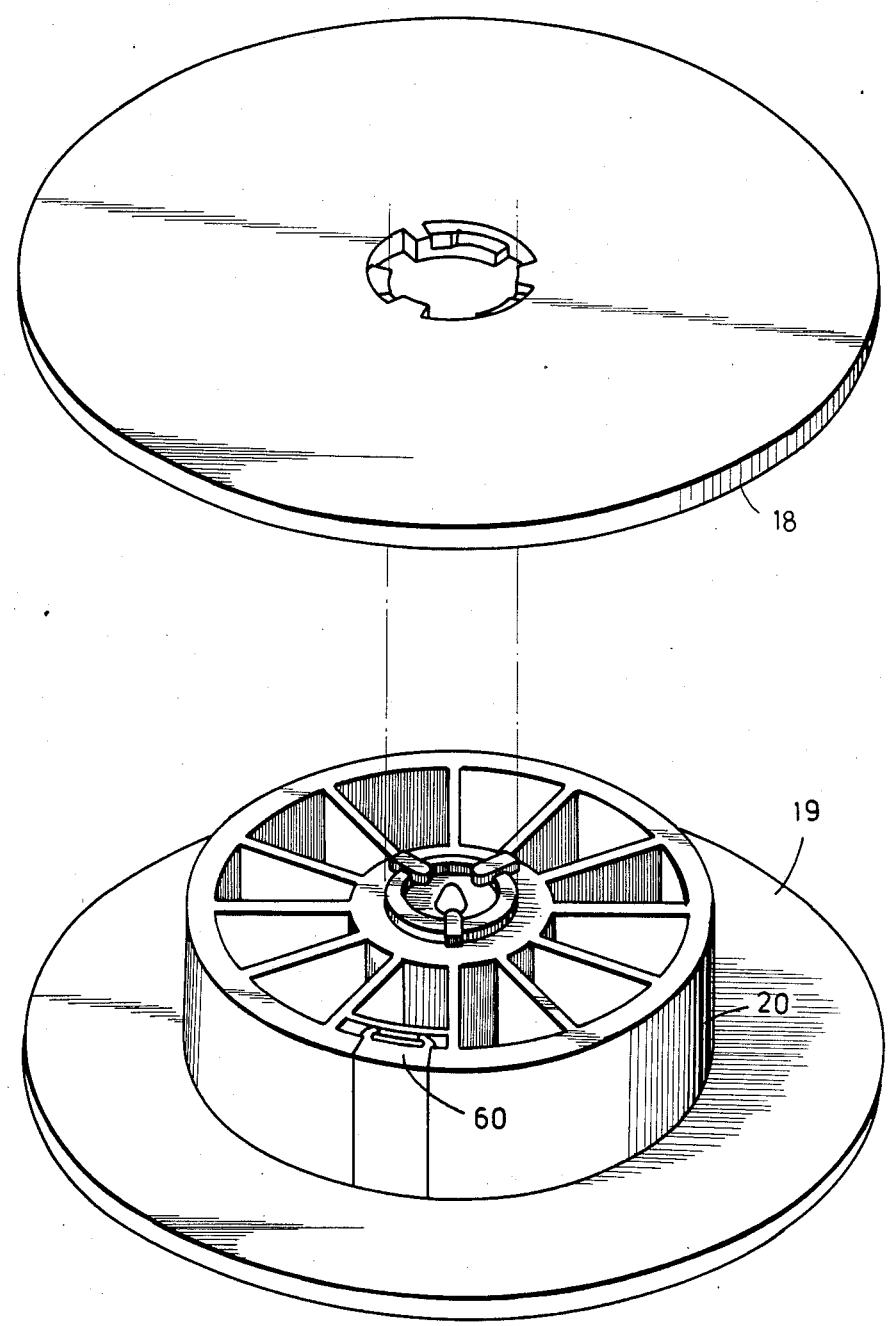
FIG. 6 is a top perspective view of another embodiment of the tape reel.

FIG. 6 shows another embodiment of the tape reel which is different from that of FIG. 5 in that the rim 20 of the upper reel member 18 is transferred onto the lower reel member 19.

Figure 11:
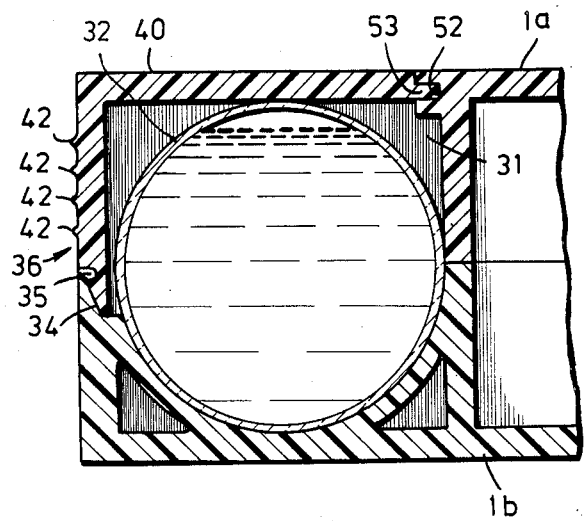
FIG. 11 is a cross-sectional view of FIG. 1 taken along with the cut line II—II, showing the structure of the detergent storage unit.

As shown in FIG. 2, in the space between the tape reels 2a and 2b is the storage compartment 31 for a bottle of detergent 32. As shown in FIG. 11, there are a snap tenon 52 on the upper cover 1a, and a snap tenon 35 on the lower cover. Cover 40 has tenons 53 and 34. First snap the tenon 53 of the outer cover 40 onto the tenon 52, and then snap the tenon 34 of the outer cover 40 onto the tenon 35 of the lower cover 1b, in order to store the bottle of detergent in the storage compartment. When opening the compartment, the press stud 36 is pushed to open the outer cover 40 and take out the bottle of detergent. It is convenient to use and operate; one does not have to worry about its loss or waste time looking for the detergent.

Figure 10:
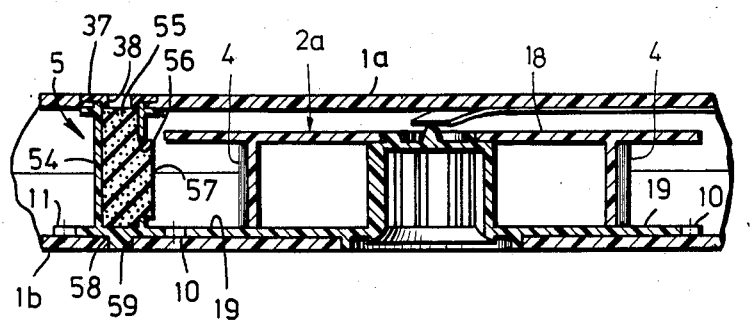
FIG. 10 is a sectional view of FIG. 1 taken along with the cut line III—III, showing the two gears in mesh.

As shown in FIG. 10, the minor gear 11 is connected with the detergent storage unit 5, while the major gear 10 is located on the circumference of the lower reel member 19 to mesh with the minor gear 11. The detergent storage unit 5 contains a cylinder 54 with cleaning felt 55 in it and a gap 56 through which the protruding part 57 of the cleaning felt 55 can jut. At the center of the minor gear 11 is an extending axis 58 that can be rotatably mounted in the hole 59 of the lower cover 1b, while on the top of the cylinder 54 is mounted a liquid guide element 37. Therefore, the whole detergent storage unit 5 is rotatably supported.

Figure 12:
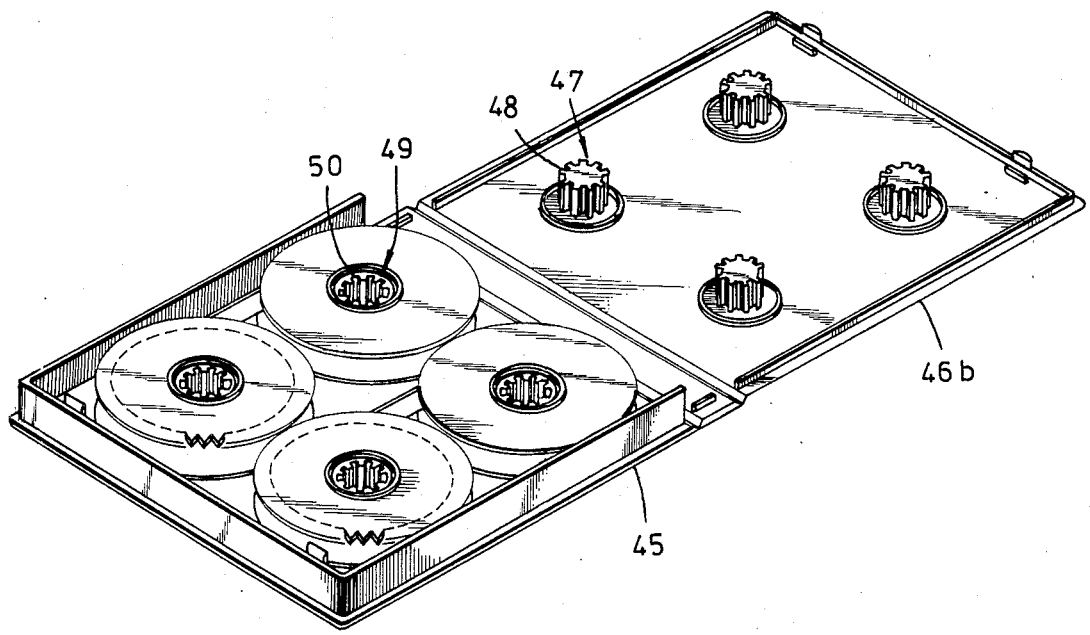
FIG. 12 is a perspective view of the structure of opened storage box for cleaning tape.

Please refer to FIG. 12. The present invention also provides a cleaning tape storage box 45 which includes a lower cover 46a and an upper cover 46 on which are several protruding fixed elements 47. It is equipped with several protruding ribs 48 which, when the storage box is closed, can fit into the groove 50 of the driving cavities 49 on the tape reel, thus preventing the tape reel from rotating, which otherwise might loosen the cleaning tape. It is convenient to keep and carry.

I claim:

1. A cleaning device for cleaning a magnetic head of a video tape recorder, said video tape recorder including a loading chamber for accepting a cartridge containing a video tape to be played and a driving mechanism which causes said video tape to move across said magnetic head, comprising:
    a cleaning cartridge housing which fits into said loading chamber;
    two tape reels contained in said cleaning cartridge, said tape reels being rotated by said driving mechanism of said video tape recorder when said cartridge is inserted into said loading chamber and said driving mechanism is activated;
    a cleaning tape wound on said tape reels;
    a detergent storage unit rotatable mounted in the path of said cleaning tape, said detergent storage unit containing a cleaning felt for dispensing a detergent along a predetermined portion of the circumference of said detergent storage unit, wherein said cleaning felt presses against the outer surface of said cleaning tape and dispenses said detergent onto said cleaning tape; and
    a detergent driving means mounted between said detergent storage unit and one of said tape reels, said detergent driving means rotating said detergent storage unit and said tape reel at a predetermined velocity ratio such that the outer circumferences of said detergent storage unit and said tape reel rotate at an approximately equivalent speed, wherein said cleaning tape is intermittently coated by said detergent when said tape reels are rotated by said driving mechanism, and wherein said coated cleaning tape contacts said magnetic head for cleaning.

2. A cleaning device in accordance with claim 1, said cleaning cartridge housing comprising:
    a first cover with a first side having a first snap tenon, and a second side, complementary to said first side, having a second snap tenon;
    a second cover, complementary to said first cover, with a first side having a first snap tenon, and a second side, complementary to said first side, having a second snap tenon;
    wherein said first side of said first cover connects with said first side of said second cover, and wherein said second side of said first cover connects with said second side of said second cover.

3. A cleaning device in accordance with claim 2, wherein said first tenon of said first cover connects with said first tenon of said second cover; and
    wherein said second tenon of said first cover connects with said second tenon of said second cover.

4. A cleaning device in accordance with claim 2, wherein said second cover has a compartment for storing a bottle of detergent.

5. A cleaning device in accordance with claim 4, wherein said first cover contains a hole through which said bottle of detergent is placed into or taken out of said compartment in said second cover.

6. A cleaning device in accordance with claim 1, each of said tape reels comprising:
    a first reel member with a rim on which to wind said cleaning tape, said first reel member also containing a hole and a retaining ring at its center; and
    a second reel member with a center pole for insertion into said hole of said first reel member, said second reel member also containing at least two tenons on said center pole forming a circle.

7. A cleaning device in accordance with claim 6, wherein said retaining ring of said first reel member has at least two gaps for insertion of the at least two tenons of said second reel member.

8. A cleaning device in accordance with claim 6, wherein said retaining ring has at least two extended parts, each of said extended parts containing a guiding stage, a positioning stage, and an impediment such that said retaining ring slides through said guiding stage into said positioning stage and is stopped by said impediment.

9. A cleaning device in accordance with claim 1, each of said tape reels comprising:
    a first reel member with a hole and a retaining ring at its center, said retaining ring having at least two gaps and at least two extended parts, each of said extended parts having a guiding stage, a positioning stage, and an impediment; and a second reel member with a rim on which to wind said cleaning tape, said second reel member having at least two tenons on said rim forming a circle corresponding to said retaining ring in said first reel member, wherein said tenons snap into their respective gaps in said retaining ring such that the relative rotation of said first and second reel members slides said tenons along said guiding stage into said positioning stage of said extended apart until stopped by said impediment.

10. A cleaning device in accordance with claim 1, wherein said cleaning tape and said tape reels are removable, said removed cleaning tape and tape reels being stored in a storage box.

11. A cleaning device in accordance with claim 10, wherein said storage box comprises:

a first cover with a plurality of fixed elements, each of said fixed elements having several protruding ribs for securing one of said tape reels; and a second cover, in mobile connection with said first cover such that said second cover completely covers said first cover.

12. A cleaning device in accordance with claim 1, wherein said detergent driving means comprises teeth of a first gear mounted on said detergent storage unit and teeth of a second gear mounted on said one tape reel, said first gear and said second gear enmeshed such that said detergent storage unit and said one tape reel move in said predetermined velocity ratio.

13. A cleaning device in accordance with claim 12, wherein said predetermined velocity ratio is determined by the following relationship:

$$N_D/N_T = D_D/D_T$$

where
$N_D$ = the number of teeth of said first gear
$N_T$ = the number of teeth of said second gear
$D_D$ = the diameter of said detergent storage unit
$D_T$ = the mean diameter of said tape reel before and after the winding of said cleaning tape.

* * * * *